US012621720B2

(12) United States Patent
Ballew et al.

(10) Patent No.: US 12,621,720 B2
(45) Date of Patent: May 5, 2026

(54) SYSTEMS AND METHODS TO EXTEND WIRELESS ACCESS RANGE

(71) Applicant: CenturyLink Intellectual Property LLC, Broomfield, CO (US)

(72) Inventors: Dean Ballew, Sterling, VA (US); John R.B. Woodworth, Amissville, VA (US)

(73) Assignee: CenturyLink Intellectual Property LLC, Denver, CO (US)

( * ) Notice: Subject to any disclaimer, the term of this patent is extended or adjusted under 35 U.S.C. 154(b) by 347 days.

(21) Appl. No.: 18/486,838

(22) Filed: Oct. 13, 2023

(65) Prior Publication Data

US 2024/0163729 A1 May 16, 2024

Related U.S. Application Data

(60) Provisional application No. 63/383,618, filed on Nov. 14, 2022.

(51) Int. Cl.
*H04W 28/18* (2009.01)
*H04W 12/04* (2021.01)
*H04W 88/08* (2009.01)

(52) U.S. Cl.
CPC ........... *H04W 28/18* (2013.01); *H04W 12/04* (2013.01); *H04W 88/08* (2013.01)

(58) Field of Classification Search
None
See application file for complete search history.

(56) References Cited

U.S. PATENT DOCUMENTS

| | | | | |
|---|---|---|---|---|
| 9,210,623 | B2 * | 12/2015 | Pang ................. | H04W 36/0033 |
| 10,050,930 | B2 * | 8/2018 | Balasingh ............ | H04W 72/04 |
| 10,405,366 | B1 * | 9/2019 | Liu ...................... | H04W 76/15 |
| 10,638,323 | B2 * | 4/2020 | Kitano .................. | H04W 12/04 |
| 10,728,807 | B1 * | 7/2020 | Kumar ................. | H04W 12/73 |
| 11,218,462 | B2 * | 1/2022 | Anantha ............... | H04W 16/14 |
| 11,283,475 | B1 * | 3/2022 | Tsai ...................... | H04W 28/20 |
| 11,350,358 | B2 * | 5/2022 | Shibata ............. | H04W 12/0431 |
| 11,405,789 | B1 * | 8/2022 | Wei ........................ | H04W 4/50 |
| 11,503,568 | B2 * | 11/2022 | Kang .................... | H04W 48/16 |
| 11,510,261 | B2 * | 11/2022 | Ho ........................ | H04W 88/08 |
| 11,570,688 | B2 * | 1/2023 | Polacheck ......... | H04W 56/0015 |
| 11,627,526 | B2 * | 4/2023 | Cherian ............... | H04W 72/23 |
| | | | | 370/329 |
| 11,902,887 | B2 * | 2/2024 | Gan ...................... | H04W 48/08 |
| 11,963,083 | B2 * | 4/2024 | Gan ...................... | H04W 48/08 |
| 11,963,097 | B2 * | 4/2024 | Seok .................... | H04W 74/006 |
| 12,034,540 | B2 * | 7/2024 | Gan ...................... | H04L 1/0083 |
| 12,034,695 | B2 * | 7/2024 | Vegas ................. | H04L 61/5038 |
| 12,089,145 | B2 * | 9/2024 | Huang .................. | H04W 36/08 |
| 12,335,780 | B2 * | 6/2025 | Seok .................... | H04W 28/082 |

* cited by examiner

*Primary Examiner* — Eunsook Choi

(57) ABSTRACT

In a wireless network, the radio frequency (RF) environment of devices that are part of the network may change, for example, as portable devices are moved by users, or as other objects (which may obstruct or reflect RF signals) move within the environment. As such, systems and methods to extend wireless access range are provided.

18 Claims, 3 Drawing Sheets

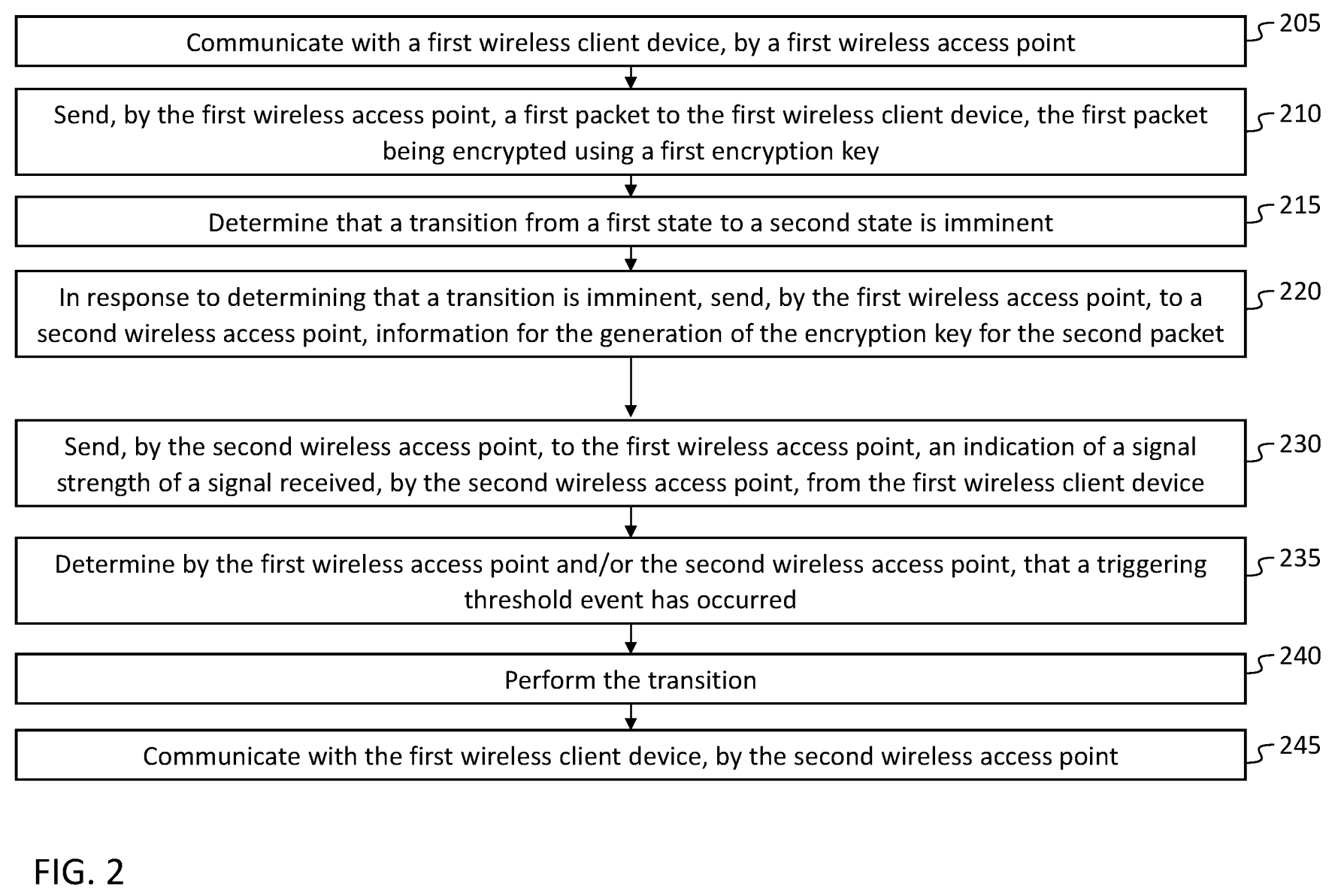

205 — Communicate with a first wireless client device, by a first wireless access point 210 — Send, by the first wireless access point, a first packet to the first wireless client device, the first packet being encrypted using a first encryption key 215 — Determine that a transition from a first state to a second state is imminent 220 — In response to determining that a transition is imminent, send, by the first wireless access point, to a second wireless access point, information for the generation of the encryption key for the second packet 230 — Send, by the second wireless access point, to the first wireless access point, an indication of a signal strength of a signal received, by the second wireless access point, from the first wireless client device 235 — Determine by by the first wireless access point and/or the second wireless access point, that a triggering threshold event has occurred 240 — Perform the transition 245 — Communicate with the first wireless client device, by the second wireless access point

FIG. 2

SYSTEMS AND METHODS TO EXTEND WIRELESS ACCESS RANGE

CROSS-REFERENCE TO RELATED APPLICATIONS

This application claims the benefit of U.S. Provisional Application No. 63/383,618 filed Nov. 14, 2022, entitled "Systems and Methods to Extend Wireless Access Range," which is incorporated herein by reference in its entirety.

FIELD

One or more aspects of examples according to the present disclosure relate to wireless networks, and more particularly to systems and methods to extend wireless access range.

BACKGROUND

In a wireless network, the radio frequency (RF) environment of devices that are part of the network may change, for example, as portable devices are moved by users, or as other objects (which may obstruct or reflect RF signals) move within the environment.

It is with respect to this general technical environment that aspects of the present disclosure are related. While relatively specific examples have been discussed, it should be understood that aspects of the present disclosure should not be limited to solving the specific examples identified in the background.

SUMMARY

In aspects, systems and methods to extend wireless access range are provided. In an aspect, a method includes communicating with a first wireless client device, by a first wireless access point, the first wireless access point using, as a local media access control address, a first media access control address; and communicating with the first wireless client device, by a second wireless access point, the second wireless access point using, as a local media access control address, the first media access control address.

In another aspect, a system, comprises a first wireless access point comprising: a first processing circuit, and a first memory, operatively connected to the first processing circuit; and a second wireless access point comprising: a second processing circuit, and a second memory, operatively connected to the first processing circuit. In examples, the first memory and the second memory store instructions that, when executed by the first processing circuit and the second processing circuit respectively, cause the system to perform a method. In examples, the method comprises: communicating, with a first wireless client device, by the first wireless access point, using, as its local media access control address, a first media access control address; and communicating, with the first wireless client device, by the second wireless access point, using, as its local media access control address, the first media access control address.

In another aspect, a system comprises: a first wireless access point comprising: a first processing circuit, and a first memory, operatively connected to the first processing circuit; and a second wireless access point comprising: a second processing circuit, and a second memory, operatively connected to the first processing circuit. In examples, the first memory and the second memory store instructions that, when executed by the first processing circuit and the second processing circuit respectively, cause the system to perform a method. In examples, the method comprises: negotiating a transition, by the first wireless access point and the second wireless access point, from a first state to a second state; and performing the transition, by the first wireless access point and the second wireless access point, wherein: in the first state, the first wireless access point is responsible for communications with a first wireless client device; in the second state, the second wireless access point is responsible for communications with the first wireless client device; the negotiating of the transition comprises negotiating the transition based on: a characteristic of a first signal channel, between the first wireless access point and the first wireless client device, and a characteristic of a second signal channel, between the second wireless access point and the first wireless client device; and the performing of the transition comprises sending, by the first wireless access point, to the second wireless access point, a first encryption key, for use, by the second wireless access point, in the generation of a second encryption key, to be used, by the second wireless access point, to encrypt a packet to be sent to the first wireless client device.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

These and other features and advantages of the present disclosure will be appreciated and understood with reference to the specification, claims, and appended drawings. Non-limiting and non-exhaustive examples are described with reference to the following figures:

FIG. 2 is a flow chart of a method, according to an example of the present disclosure.

DETAILED DESCRIPTION

The detailed description set forth below in connection with the appended drawings is intended as a description of exemplary embodiments of systems and methods to extend wireless access range provided in accordance with the present disclosure and is not intended to represent the only forms in which the present disclosure may be constructed or utilized. The description sets forth the features of the present disclosure in connection with the illustrated examples. It is to be understood, however, that the same or equivalent functions and structures may be accomplished by different examples that are also intended to be encompassed within the scope of the disclosure. As denoted elsewhere herein, like element numbers are intended to indicate like elements or features.

Figure 1:
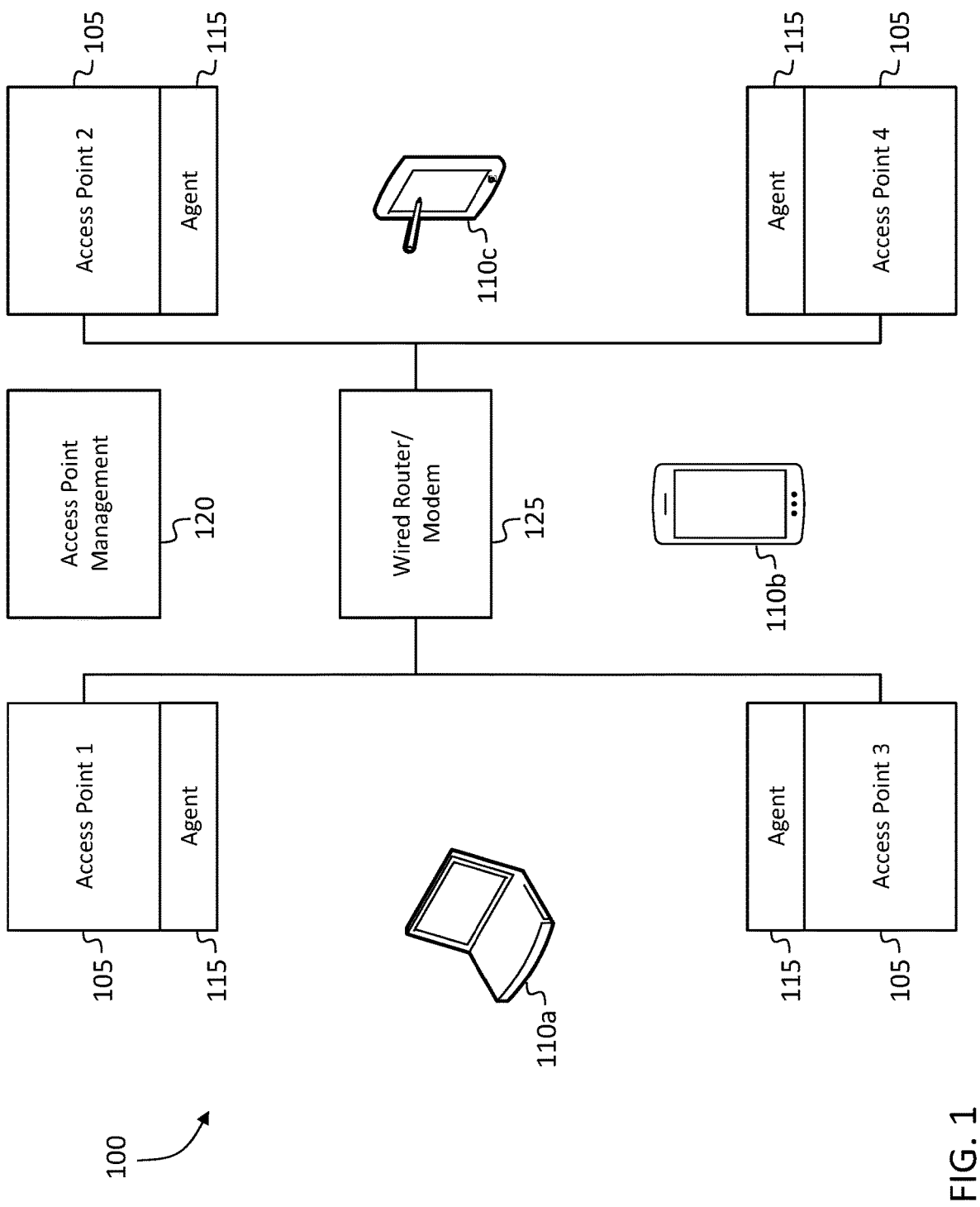
FIG. 1 is a block diagram of a network, according to an example of the present disclosure.

Referring to FIG. 1, in some examples a network 100 includes a plurality of wireless access points 105 communicating, over one or more wireless channels, with one or more wireless client devices 110, e.g., a laptop computer 110a, a mobile telephone 110b, and a tablet computer 110c. The wireless access points 105 and the wireless client devices 110 may collectively be referred to as "wireless devices." Various wireless channels may be available for communications between the wireless access points 105 and the wireless client devices 110 (e.g., 20 MHz-wide channels, adjacent pairs of which may be combined to form 40 MHz-wide channels). An access point management system 120 may provide an interface through which a system administrator may configure the network, e.g., assigning Internet Protocol (IP) addresses or Service Set Identifiers (SSIDs). Each of the wireless client devices 110 may have one or more connections (through a respective wireless access point 105 and through a router and modem 125 to which the wireless access points 105 may be connected (e.g., by wired connections)) to one or more outside servers, e.g., servers on the internet. In examples, the wireless access points 105 are devices that connect through a wired connection (e.g., Ethernet cable) to a router and transmit and receive wireless (e.g., WiFi) signals to create a wireless local area network. In examples, each wireless access point 105 comprises at least one processing circuit and a radio frequency (RF) transceiver. In some examples, the router/modem 125 may, itself, comprise a wireless access point.

As used herein, a "wireless channel" is a frequency or range of frequencies that are used for wireless data transmission. As used herein, a "signal channel" is a set of characteristics of a wireless channel, e.g., the signal gain (or attenuation, which may be expressed as a gain less than 1) from a transmitting antenna to a receiving antenna. Further characteristics of the signal channel may include the levels of noise and interference, multipath characteristics, and the channel capacity (which may be related to the bandwidth and the signal-to-noise ratio of the signal channel channel).

In operation, the wireless environment of the network 100 may change in various ways, affecting the signal channel between any pair of wireless devices, or affecting the extent to which transmissions in a wireless channel used by two wireless devices affect the signal channel between another pair of wireless devices. For example, a user initially using a mobile phone 110b near one of the wireless access points 105 (e.g., near access point 4) may move away from access point 4, and, in response, access point 4 may increase the signal power it transmits to the mobile phone 110b, potentially interfering with (degrading the characteristics of) a signal channel between, for example, access point 1, and a laptop computer 110a. As another example, even if all of the mobile devices are stationary, the presence or absence of a user or another object in or near an RF signal path may affect a signal channel (e.g., it may affect the multipath characteristics of the signal channel). As another example, a user may carry a laptop computer 110a, from an initial position near access point 3 to a new position that is nearer to access point 1, and the quality of the signal channel between the laptop computer 110a and access point 3 may degrade while the quality of a signal channel that could be established between the laptop computer 110a and access point 1 may improve.

If the wireless access points 105 have different Service Set Identifiers (SSIDs), then upon losing a connection with a first one of the wireless access points 105, a wireless client device 110 may automatically connect to the wireless access point 105 having the strongest signal at the wireless client device 110. As such, if a user carries a wireless client device 110 sufficiently far from a wireless access point 105 to lose the wireless connection, then a new wireless connection may be established, by the wireless client device 110, automatically and without user participation. Such a switch from one wireless access point 105 to another wireless access point 105 may, however, be disruptive to the user because the loss of network connectivity while the wireless client device 110 connects to the second wireless access point 105 may last several seconds. In addition, the wireless client device 110 may be assigned a new Internet Protocol (IP) address when it is connected to the second wireless access point 105. The changing of the IP address of the wireless client device 110 may make it necessary for some applications (e.g., a video conferencing application that may be running on the wireless client device 110) to establish a new connection with an outside server, which may, in some cases, require that the user restart the application.

As such, in some examples, the wireless access points 105 of the network 100 are configured so as to make it possible for the wireless access points 105 to hand off responsibility for any of the wireless client devices 110 to each other in a manner that is substantially transparent to the wireless client device 110. When transitioning from a first state, in which a first wireless access point 105 is responsible for communications with a wireless client device 110, to a second state, in which a second wireless access point 105 is responsible for communications with the wireless client device 110, the second wireless access point 105 may use the same wireless channel, the same local media access control (MAC) address, the same local IP address, and the same encryption information as the first wireless access point 105, so that from the perspective of the wireless client device 110 the transition may be imperceptible, or substantially imperceptible (e.g., the transition may manifest itself only as a change in the received power or in the quality of the signal channel). As used herein, the "local" MAC address or "local" IP address of a wireless access point 105 is the source MAC address or IP address for packets it transmits, and the destination MAC address or IP address for packets it receives.

In operation, the wireless access points 105 may periodically send each other short packets (or "test packets") using the same wireless channel as those used for communicating with the wireless client devices 110, for the purpose of characterizing the signal channels between them, so that, for example, each wireless access point 105 may assess the likelihood that a transmission made by the wireless access point 105 (at a certain transmitted power level) is likely to interfere (i) with the reception, by another wireless access point 105, of a wireless transmission from a wireless client device 110 or (ii) with the reception, by a wireless client device 110, of a wireless transmission from another wireless access point 105. Each test packet may be identified as a test packet by the value of a field in the packet (e.g., the MAC address, which may be different from the MAC address used with the wireless client devices 110, or by a "magic token" which may also identify the sending wireless access point 105). When a wireless client device 110 first joins the network, it may send an initial wireless transmission, and one of the wireless access points 105 (e.g., the one that received the initial wireless transmission with the greatest received signal power, as determined by messages exchanged by the wireless access points 105) may respond and set up a wireless connection with the wireless client device 110. This wireless access point 105 may then be initially responsible for communications with the first wireless client device 110.

As the RF environment changes, decisions may occasionally be made to hand off responsibility for any of the wireless client devices 110, e.g., to transition from a first state, in which a first wireless access point 105 is responsible for communications with a first wireless client device 110 to a second state, in which a second wireless access point 105 is responsible for communications with the first wireless client device 110. Such a transition may be negotiated by the wireless access points 105 that are involved (e.g., it may be negotiated by a plurality of agents 115, each implemented on a respective one of the wireless access points 105). For example, if a wireless client device 110 is within range of both a first wireless access point 105 and a second wireless access point 105, the first wireless access point 105 and the second wireless access point 105 may periodically exchange messages (which may be generated by their respective agents 115) reporting to each other the characteristics of their respective signal channels with the wireless client device 110. If the signal channel between the first wireless access point 105 and the wireless client device 110 is stable and consistently better than the signal channel between the second wireless access point 105 and the wireless client device 110 (e.g., as a result of the wireless client device 110 being significantly closer to the first wireless access point 105), then the system may remain in the first state. If, however, the signal channel between the first wireless access point 105 and the wireless client device 110 degrades, and the signal channel between the second wireless access point 105 and the wireless client device 110 improves, then a transition to the second state may be performed. Other examples of conditions in which a transition occurs are possible and contemplated.

For example, the first wireless access point 105 and the second wireless access point 105 (which may be connected to the wireless client device 110 through a first signal channel and a second signal channel, respectively) may negotiate the conditions for a transition. The conditions may include an indication of signal channel quality such as the signal strength received by each of the first wireless access point 105 and the second wireless access point 105 from the wireless client device 110. The condition for a transition may be selected to maintain a high-quality signal channel to the wireless client device 110 while limiting the risk that frequent transitions may be triggered by small fluctuations in the quality of the signal channel (e.g., if two wireless access points 105 have respective connections to the wireless client device 110 with similar signal channel quality). As such, the wireless access points 105 may, for example, determine that a criterion for transitioning may be that a gain of the second signal channel exceeds a gain of the first signal channel by a threshold amount and for a threshold period (e.g., a threshold amount between 0.5 dB and 5 dB for at least one second). Then, if the strength of the signal received from the wireless client device 110 by the first wireless access point 105 becomes less, by the threshold amount and for more than the threshold period, than the strength of the signal received from the wireless client device 110 by the second wireless access point 105, a transition to the second state may be triggered.

Once the determination has been made to perform a transition, the first wireless access point 105 may transfer to the second wireless access point 105 the information needed to maintain the connections that the wireless client device 110 may have with one or more outside servers. Such information may include, for example, encryption information, buffered packets, received from the outside servers, to be sent to the wireless client device 110, and buffered packets, received from the wireless client device 110, to be sent to the outside servers. Possession of a token may determine responsibility for communications with the first wireless client device 110. Once the first wireless access point 105 has sent the information to the second wireless access point 105 and the second wireless access point 105 has acknowledged receipt, the first wireless access point 105 may send the token to the second wireless access point 105, thereby making the second wireless access point 105 responsible for communications with the first wireless client device 110.

The token may be sent to the second wireless access point 105 after a final packet is transmitted to the first wireless client device 110 by the first wireless access point 105, so that there is no need for the second wireless access point 105 to complete the transmission of a packet partially transmitted by the first wireless access point 105. The encryption information used to encrypt any packet for sending to a wireless client device 110 may include an encryption key which may be different for each packet sent and which may be based on the encryption key used to encrypt the previous packet; as such, if the final packet transmitted to the first wireless client device 110 by the first wireless access point 105 is encrypted using a first encryption key, then the first packet transmitted by the second wireless access point 105 to the first wireless client device 110 may be encrypted using an encryption key based on the first encryption key. The keys may be derivatives of a master-key in an encryption scheme.

In some examples, the first wireless access point 105 may, instead of waiting for the one or more criteria for a transition to be met, begin to send to the second wireless access point 105 information for the transition in advance, e.g., when it appears that a transition may be imminent. For example, if the strength of the signal received, from the wireless client device 110, by the first wireless access point 105, is greater than the signal level at which a transition may be triggered, but if the strength of the signal received by the first wireless access point 105 is steadily decreasing, the first wireless access point 105 and/or the second wireless access point 105 may determine that a transition is likely to occur, and the first wireless access point 105 may begin sending the information for a transition to the second wireless access point 105 periodically, so that once a transition is triggered, it may be completed more rapidly. In examples, the determination that a transition is likely to occur may comprise determining (e.g., by one or both of the first wireless access point 105 or second wireless access point 105) that the strength of signal between the first wireless access point 105 and the wireless client device 110 is more than a pre-transition threshold lower than the signal strength between the second wireless access point 105 and the wireless client device 110. The pre-transition threshold may, for example, be lower than the threshold that would otherwise trigger the transition. Or the determination that a transition is likely to occur may comprise determining (e.g., by one or both of the first wireless access point 105 or second wireless access point 105) that the strength of signal between the first wireless access point 105 and the wireless client device 110 is more than the triggering threshold lower than the signal strength between the second wireless access point 105 and the wireless client device 110, but the difference in signal strength has not yet persisted for the full triggering threshold period.

The communications between the first wireless access point 105 and the second wireless access point 105 may use any of several types of communication channels, such as a wireless connection using one of the frequency bands used by the network 100 for communications between the wireless access points 105 and the wireless client devices 110, or (e.g., to avoid reducing the channel capacity available for communications with wireless client devices 110) (i) a wired connection (e.g., a wired Ethernet connection through the router and modem 125) or (ii) a wireless connection using a frequency band (e.g., a frequency band at or near 900 MHz) that is separate from those used for communications between the wireless access points 105 and the wireless client devices 110. The communication links between the wireless access points 105 may be encrypted (e.g., using encryption configured through the access point management system 120) to prevent unauthorized access to the encryption information exchanged between the wireless access points 105.

In some examples, the effect of a transition on other connections between wireless access points 105 and wireless client devices 110 may be taken into account in determining whether to transition to a state in which the second wireless access point 105 is responsible for communications with the first wireless client device 110. For example, if the first wireless access point 105 is access point 3 in FIG. 1 and the second wireless access point 105 is access point 1, and the wireless client device 110 is the laptop computer 110*a*, then if (e.g., in response to a user carrying the laptop computer 110*a* to a point near access point 1) access point 1 becomes responsible for communications with the first wireless client device 110, it may mean that access point 1 will begin transmitting on a wireless channel on which it was not previously transmitting. If the same channel is being employed, for example, by another nearby wireless access point 105 (e.g., access point 2) to communicate with a second wireless client device 110 (e.g., the tablet computer 110*c*), then the transmissions by access point 1 may interfere with the communications between access point 2 and the tablet computer 110*c*. As such, in such a circumstance, the three wireless access points 105 involved (e.g., access points 1, 2, and 3) may negotiate to (i) postpone the transition to the state in which access point 1 is responsible for communications with the first wireless client device 110 (e.g., until a more stringent transition criterion is met), (ii) force one of the wireless client devices 110 to disconnect from the network 100 and reconnect on a different wireless channel, or (iii) transition instead to a state in which access point 2 is responsible for communications with both the laptop computer 110*a* and the tablet computer 110*c*. The more stringent criterion may be, for example, one that is met only when the quality of the signal channel between the access point 3 and the laptop computer 110*a* is sufficiently poor (e.g., as measured by the packet error rate) that a loss of the connection appears to be imminent.

In some examples, an artificial intelligence (AI), e.g., machine learning (ML), model may be employed to determine when to perform state transitions. Such a model may be trained, for example, using simulations (e.g., randomly created simulations) each including a plurality of wireless access points 105, and a plurality of wireless client devices 110 that may move in the simulations. A cost function used to train the model may, for example, reward decisions that avoid interruptions in the connections to the wireless client devices 110.

In some examples, two or more wireless access points 105 may phase-lock their transmissions so as to perform joint beamforming of the transmissions, providing better signal levels at the targeted wireless client devices 110 and (e.g., by generating antenna patterns with suitably placed nulls) avoiding interference at other wireless access points 105 and other wireless client devices 110. In some examples, the wireless connections between the wireless access points 105 and the wireless client devices 110 are WiFi connections; in other examples, they are wireless connections of a different type. As used herein, an access point may comprise any station for communicating, through a wireless connection, with a client device. As used herein, a "packet" (such as an Ethernet frame) is a quantity of data transmitted from one device to another device as a unit. As used herein, a "media access control address" is a physical layer address of a network interface device, e.g., it may be an Ethernet media access control address.

FIG. 2 is a flowchart of a method 200, in some examples. In examples, the method 200 may be performed by wireless access point(s) 105 described above with respect to FIG. 1. The method includes communicating, at 205, with a first wireless client device, by a first wireless access point, the first wireless access point using, as a local media access control address, a first media access control address. In examples, this may include the first wireless access point transceiving data packets between the first wireless client device and one or more external devices, such as servers that are communicatively coupled to a router/modem to which the first wireless access point is connected. In examples, the first media access control address used by the first wireless access point for communications with the first wireless client device is transferrable. In addition, the communications between the first wireless access point and the first wireless client device may utilize a first local IP address for the first wireless client device that is assigned and/or managed by the router/modem to which the wireless access point is connected.

Flow proceeds to operation 210, where the first wireless access point sends a first packet to the first wireless client device, the first packet being encrypted using a first encryption key. In this example, the term "first" is used to denote a particular packet, not a first-in-time packet. In examples, the first wireless access point may encrypt packets using an encryption key that is based, in part, on a previous encryption key used by the wireless access point for communications with the first wireless client device and information about a previous packet transceived by the first wireless access point for such first wireless client device.

Flow proceeds to operation 215, where it is determined that a transition from a first state to a second state is imminent. In the first state, the first wireless access point may be responsible for communications with the first wireless client device, and in the second state, a second wireless access point may be responsible for communications with the first wireless client device. For example, if the strength of the signal received from the wireless client device by the first wireless access point is still greater than a triggering threshold at which a transition may be triggered, but if the strength of the signal received by the first wireless access point is steadily decreasing, the first wireless access point and/or the second wireless access point may determine that a transition is likely to occur. In other examples, it may be determined that the strength of signal from the first client device at the second wireless access point is greater by a pre-triggering threshold margin, which may be less than the threshold at which a transition is actually triggered. Or it may be determined that the strength of signal from the first client device at the second wireless access point is greater by a triggering threshold margin, but not yet for a triggering threshold period (thus indicating that a transition is imminent when the triggering threshold period expires, assuming the difference in signal strength remains above the triggering threshold). Other examples of determining that a transition is imminent are possible and contemplated.

The method may further include, at 220, in response to determining that a transition may be imminent, sending, by the first wireless access point, to the second wireless access point, information for the generation of the encryption key for a second packet. In examples, and the first wireless access point may begin sending the information for a transition to the second wireless access point periodically, so that once a transition is triggered, it may be completed more rapidly. As discussed, this may include the first wireless access point providing information to the second wireless access point to allow the second wireless access point to generate an encryption key that can later be used when the second wireless access point takes over communications with the first wireless client device.

Flow may proceed to operation 230, where the second wireless access point may send to the first wireless access point, an indication of a signal strength of a signal received, by the second wireless access point, from the first wireless client device. In examples, operation 230 may occur in response to the first wireless access point requesting the signal strength from the second wireless access point after determining that the transition may be imminent (e.g., because the signal strength of the first wireless access point is rapidly diminishing). In other examples, operation 230 may occur periodically as part of an ongoing sharing of information among the wireless access points.

Flow proceeds to operation 235, where the first wireless access point and/or the second wireless access point may determine that a transition triggering event has occurred. For example, it may be determined that a gain of the second signal channel exceeds a gain of the first signal channel by a triggering threshold amount and for a triggering threshold period. In examples, this may be determined by one or both of the first and second wireless access points and acknowledged by messaging between the two access points. In other examples, this may be determined solely by the first wireless access point. For example, if the determination is made in whole or in part by the second wireless access point, then the first wireless access point must communicate its latest signal strength to the wireless client device to the second wireless access point (e.g., as part of the communication at operation 220). In some examples, it may be advantageous for the first wireless access point to make the determination because, in examples, the first wireless access point may be communicating with multiple other wireless access points to determine which one to transition the wireless client device to (e.g., based on the respective signal strengths of second, third, and fourth wireless access points). In other examples, the second wireless access point may make the determination and assume the transition to the second wireless access point is occurring if the gain of the second signal channel exceeds a gain of the first signal channel by a threshold amount.

Flow proceeds to operation 240 where the first wireless access point and the second wireless access point perform the transition from the first state to the second state. In examples, this may include the first wireless access point and the second wireless access point acknowledging the transition to each other. In examples, operation 240 further includes transferring, by the first wireless access point to the second wireless access point, the first media control address that was previously used by the first wireless access point in communications with the first wireless client device.

Flow proceeds to operation 245, where the second wireless access point communicates with the first wireless client device using, as a local media access control address, the first media access control address. In examples, such communication (e.g., a second packet) may also make use of an encryption key based on the first encryption key previously communicated by the first wireless access point. In this manner, the transition may be invisible to the wireless client device.

Figure 3:
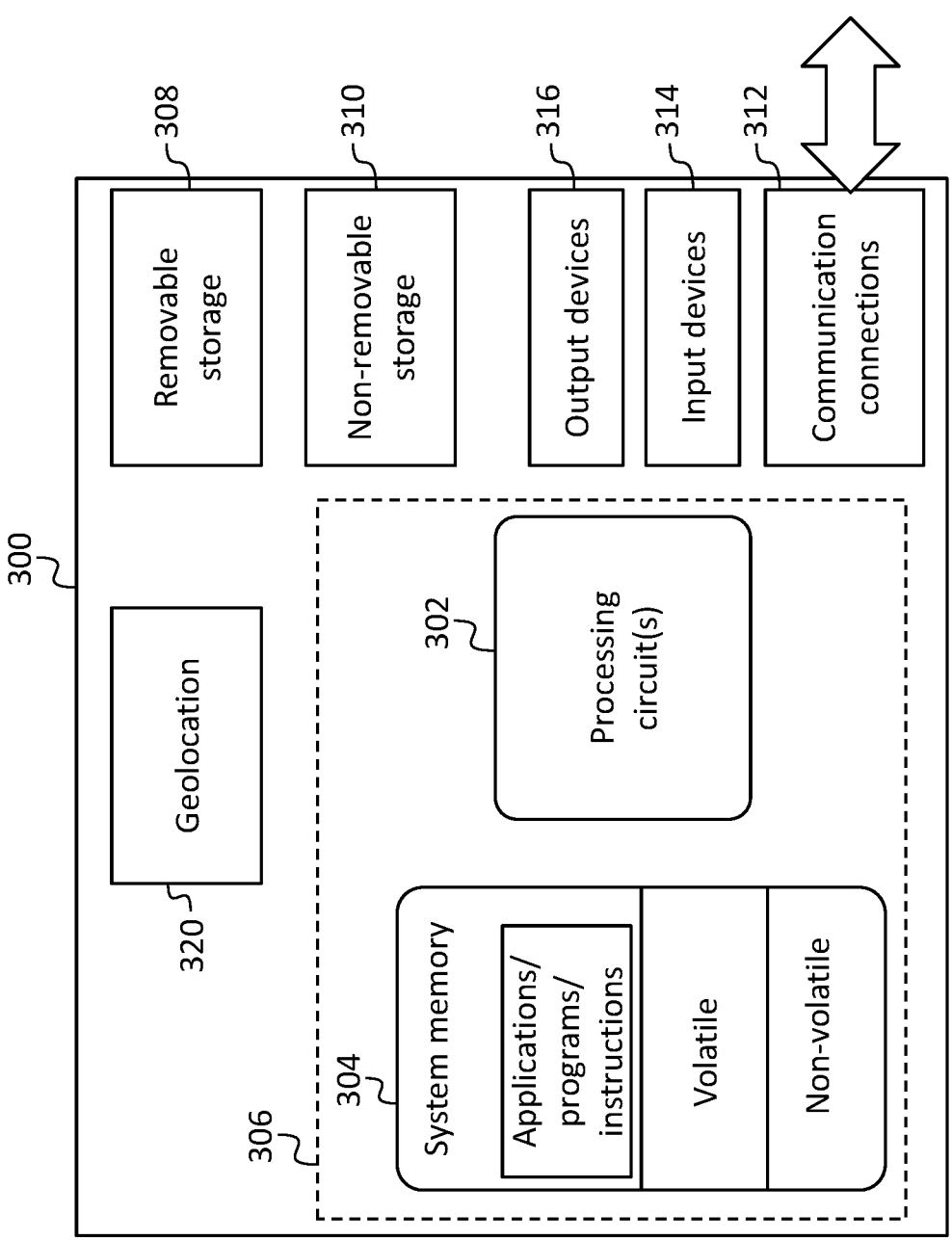
FIG. 3 is a block diagram of an operating environment, according to an example of the present disclosure.

FIG. 3 depicts an example of a suitable operating environment 300, portions of which may be used to implement the wireless client devices 110, the wireless access points 105, or other computing devices within the systems discussed herein. In its most basic configuration, operating environment 300 typically includes at least one processing circuit 302 and memory 304. The processing circuit may be a processor, which is hardware. Depending on the exact configuration and type of computing device, memory 304 (storing instructions to perform the methods disclosed herein) may be volatile (such as RAM), non-volatile (such as ROM, flash memory, etc.), or some combination of the two. This most basic configuration is illustrated in FIG. 3 by dashed line 306. The memory 304 stores instructions that, when executed by the processing circuit(s) 302, perform the processes and operations described herein. Further, environment 300 may also include storage (removable 308, or non-removable 310) including, but not limited to, solid-state, magnetic disks, optical disks, or tape. Similarly, environment 300 may also have input device(s) 314 such as keyboard, mouse, pen, voice input, etc., or output device(s) 316 such as a display, speakers, printer, etc. Additional communication connections 312 may also be included that allow for further communication with LAN, WAN, point-to-point, etc. Operating environment 300 may also include geolocation devices 320, such as a global positioning system (GPS) device.

Operating environment 300 typically includes at least some form of computer readable media. Computer readable media can be any available media that can be accessed by processing circuit 302 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Computer storage media is non-transitory and does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, microwave, and other wireless media. Combinations of any of the above should also be included within the scope of computer readable media.

As used herein, the word "or" is inclusive, so that, for example, "A or B" means any one of (i) A, (ii) B, and (iii) A and B. As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

Although exemplary embodiments of a systems and methods to extend wireless access range have been specifically described and illustrated herein, many modifications and variations will be apparent to those skilled in the art. Accordingly, it is to be understood that a systems and methods to extend wireless access range constructed according to principles of this disclosure may be embodied other than as specifically described herein. The invention is also defined in the following claims, and equivalents thereof.

What is claimed is:

1. A method, comprising:
communicating with a first wireless client device, by a first wireless access point, the first wireless access point using, as its local media access control address, a first media access control address; and
communicating with the first wireless client device, by a second wireless access point, the second wireless access point using, as its local media access control address, the first media access control address, wherein:
the communicating, by the first wireless access point, with the first wireless client device comprises communicating using a first Internet Protocol address for the first wireless client device; and
the communicating, by the second wireless access point, with the first wireless client device comprises communicating using the first Internet Protocol address for the first wireless client device.

2. The method of claim 1, further comprising performing a transition, by the first wireless access point and the second wireless access point, from a first state to a second state, wherein:
in the first state, the first wireless access point is responsible for communications with the first wireless client device, and
in the second state, the second wireless access point is responsible for communications with the first wireless client device.

3. The method of claim 2, further comprising:
sending, by the first wireless access point, a first packet to the first wireless client device, the first packet being encrypted using a first encryption key; and
sending, by the second wireless access point, a second packet to the first wireless client device, the second packet being encrypted using an encryption key based on the first encryption key.

4. The method of claim 3, further comprising:
determining that the transition is imminent; and
in response to determining that the transition is imminent, sending, by the first wireless access point, to the second wireless access point, information for the generation of the encryption key for the second packet and transferring the first media access control address to the second wireless access point.

5. The method of claim 2, wherein determining that the transition is imminent comprises determining that a first signal strength of a first signal received from the first wireless client device at the second wireless access point exceeds a second signal strength of a second signal received from the first wireless client device at the first wireless access point by at least a pre-trigger threshold.

6. The method of claim 2, further comprising negotiating the transition based on:
a characteristic of a first signal channel, between the first wireless access point and the first wireless client device, and
a characteristic of a second signal channel, between the second wireless access point and the first wireless client device.

7. The method of claim 6, wherein the negotiating comprises sending, by the second wireless access point, to the first wireless access point, an indication of a signal strength of a signal received, by the second wireless access point, from the first wireless client device.

8. The method of claim 7, wherein the negotiating of the transition comprises determining, by the first wireless access point and the second wireless access point, that a gain of the second signal channel exceeds a gain of the first signal channel by a threshold amount.

9. The method of claim 5, wherein:
the communicating, by the first wireless access point with the first wireless client device, comprises communicating over a first wireless channel;
the communicating, by the second wireless access point with the first wireless client device, comprises communicating over the first wireless channel; and
the negotiating of the transition comprises communicating, between the first wireless access point and the second wireless access point, over a second channel, different from the first wireless channel.

10. The method of claim 9, wherein the second channel comprises a wired connection.

11. A system, comprising:
a first wireless access point comprising:
a first processing circuit, and
a first memory, operatively connected to the first processing circuit; and
a second wireless access point comprising:
a second processing circuit, and
a second memory, operatively connected to the first processing circuit,
the first memory and the second memory storing instructions that, when executed by the first processing circuit and the second processing circuit respectively, cause the system to perform a method, the method comprising:
communicating, with a first wireless client device, by the first wireless access point, using, as its local media access control address, a first media access control address; and communicating, with the first wireless client device, by the second wireless access point, using, as its local media access control address, the first media access control address, wherein:

the communicating, by the first wireless access point, with the first wireless client device comprises communicating using a first Internet Protocol address for the first wireless client device; and the communicating, by the second wireless access point, with the first wireless client device comprises communicating using the first Internet Protocol address for the first wireless client device.

12. The system of claim 11, wherein the method further comprises performing a transition, from a first state to a second state, wherein:

in the first state, the first wireless access point is responsible for communications with the first wireless client device, and in the second state, the second wireless access point is responsible for communications with the first wireless client device.

13. The system of claim 12, wherein the method further comprises:

sending, by the first wireless access point, a first packet to the first wireless client device, the first packet being encrypted using first encryption information; and sending, by the second wireless access point, a second packet to the first wireless client device, the second packet being encrypted using encryption information based on the first encryption information.

14. The system of claim 12, wherein the method further comprises negotiating the transition, by the first wireless access point and the second wireless access point.

15. The system of claim 14, wherein the negotiating of the transition comprises negotiating the transition based on:

a characteristic of a first signal channel, between the first wireless access point and the first wireless client device, and a characteristic of a second signal channel, between the second wireless access point and the first wireless client device.

16. The system of claim 15, wherein the negotiating comprises sending, by the second wireless access point, to the first wireless access point, an indication of a signal strength of a signal received, by the second wireless access point, from the first wireless client device.

17. The system of claim 16, wherein the negotiating of the transition comprises determining, by the first wireless access point and the second wireless access point, that a gain of the second signal channel exceeds a gain of the first signal channel by a threshold amount.

18. A system, comprising:

a first wireless access point comprising:

a first processing circuit, and a first memory, operatively connected to the first processing circuit; and a second wireless access point comprising:

a second processing circuit, and a second memory, operatively connected to the first processing circuit, the first memory and the second memory storing instructions that, when executed by the first processing circuit and the second processing circuit respectively, cause the system to perform a method, the method comprising:

negotiating a transition, by the first wireless access point and the second wireless access point, from a first state to a second state; and performing the transition, by the first wireless access point and the second wireless access point, wherein:

in the first state, the first wireless access point is responsible for communications with a first wireless client device;

in the second state, the second wireless access point is responsible for communications with the first wireless client device;

the negotiating of the transition comprises negotiating the transition based on:

a characteristic of a first signal channel, between the first wireless access point and the first wireless client device, and a characteristic of a second signal channel, between the second wireless access point and the first wireless client device; and the performing of the transition comprises sending, by the first wireless access point, to the second wireless access point, a first encryption key, for use, by the second wireless access point, in the generation of a second encryption key, to be used, by the second wireless access point, to encrypt a packet to be sent to the first wireless client device.

* * * * *